United States Patent [19]

Yoshida et al.

[11] Patent Number: 4,737,540

[45] Date of Patent: Apr. 12, 1988

[54] CARBON FIBER REINFORCED POLYESTER RESIN COMPOSITION

[75] Inventors: Tomohiko Yoshida, Kamakura; Naoyuki Suzuki, Yokohama, both of Japan

[73] Assignee: Mitsubishi Rayon Co., Ltd., Tokyo, Japan

[21] Appl. No.: 778,242

[22] Filed: Sep. 20, 1985

[30] Foreign Application Priority Data

Oct. 8, 1984 [JP] Japan .................. 59-210941
Oct. 8, 1984 [JP] Japan .................. 59-210942
Oct. 8, 1984 [JP] Japan .................. 59-210943

[51] Int. Cl.⁴ .................. B32B 9/00; C08L 67/02
[52] U.S. Cl. .................. 524/537; 428/367; 428/408; 523/205; 523/215
[58] Field of Search .......... 428/367, 395, 290, 408; 524/537, 304, 303, 394, 396, 141, 140; 523/205, 215

[56] References Cited

U.S. PATENT DOCUMENTS

| | | | |
|---|---|---|---|
| 4,088,709 | 5/1978 | Seymour et al. | 524/537 X |
| 4,115,333 | 9/1978 | Phipps, Jr. et al. | 524/537 X |
| 4,201,704 | 5/1980 | Cohen et al. | 524/537 |
| 4,352,907 | 10/1982 | Lee | 524/537 |
| 4,533,680 | 8/1985 | Kasuga et al. | 524/537 |

*Primary Examiner*—Lorraine T. Kendell
*Attorney, Agent, or Firm*—Oblon, Fisher, Spivak, McClelland & Maier

[57] ABSTRACT

Disclosed is a carbon fiber reinforced polyester resin composition comprising (A) 30 to 98.985% by weight of a thermoplastic polyester resin, (B) 1 to 60% by weight of a carbon fiber, (C) 0.01 to 5% by weight of at least one compound selected from the following compounds (I), (II) and (III):

(I) at least one sulphur compound represented by the following formula (X):

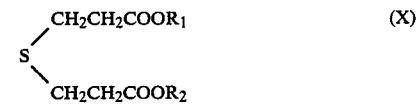

wherein $R_1$ and $R_2$ stand for $C_mH_{2m+1}$ radical, and m stands for a recurring number of 1 to 30, (II) at least one salt of an organic carboxylic acid with a metal of the group Ia or IIa of the Periodic Table, (III) a phosphorus compound, and (D) 0.005 to 5% by weight of at least one polycarbonate resin represented by the following formula (IV),

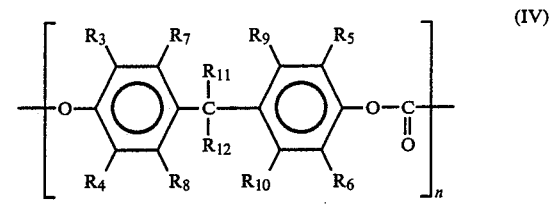

wherein $R_3$ through $R_{10}$ stand for independently a hydrogen atom or a halogen atom, $R_{11}$ and $R_{12}$ stand for independently an alkyl radical, and n stands for an average recurring number of not less than 3.

This carbon fiber reinforced polyester resin composition can be adapted to be molded into formed products with minimized sink mark and thus superior appearance.

16 Claims, No Drawings

CARBON FIBER REINFORCED POLYESTER RESIN COMPOSITION

BACKGROUND OF THE INVENTION

1. Field of the Invention

This invention relates to a carbon fiber reinforced polyester resin composition, and more particularly to the same adapted to be molded into formed products with minimized sink mark and thus superior appearance.

2. Description of the Prior Art

Generally, injection molding provides formed products often with sink mark on the back of boss or rib, particularly when they have great thickness. So far, as a countermeasure against occurrence of sink mark, use of a variety of foaming agents has been investigated. With the existing forming agents, however, when thermoplastic polyester resin, such as polyethylene terephthalate or polybutylene terephthalate, is extruded with kneading to be pelletized, forming ocurrs during extrusion. The thus-obtained pellets fail to be molded into products free from sink mark.

SUMMARY OF THE INVENTION

It is an object of the invention to provide a carbon fiber reinforced polyester resin composition having such characteristic that it is not subjected to foaming during extrusion, even if made at high temperatures, but foaming occurs in injection molder, and thus adapted to be molded into product with minimized sink mark and superior appearance.

The above object of the present invention is accomplished by a carbon fiber reinforced polyester rein composition comprising (A) 30 to 98.985% by weight of a thermoplastic polyester resin, (B) 1 to 60% by weight of a carbon fiber, (c) 0.01 to 5% by weight of at least one compound selected from the following compounds (I), (II) and (III):

(I) at least one sulphur compound represented by the following formula (X)

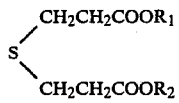 (X)

wherein $R_1$ and $R_2$ stand for $C_mH_{2m+1}$ radical, and m stands for a recurring number of 1 to 30, (II) at least one salt of an organic carboxylic acid with a metal of the group Ia or IIa of the Periodic Table, (III) a phosphorus compound, and (D) 0.005 to 5% by weight of at least one polycarbonate resin represented by the following formula (IV),

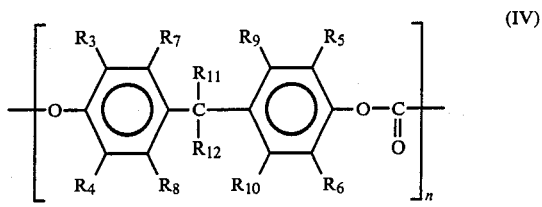

wherein $R_3$ through $R_{10}$ stand for independently a hydrogen atom or a halogen atom, $R_{11}$ and $R_{12}$ stand for independently an alkyl radical, and n stands for an average recurring number of not less than 3.

The composition has proved adapted to be molded, with prevention of occurrence of sink mark in virtue of the utilization of foaming phenomenon associated with its characteristic.

DETAILED DESCRIPTION OF THE PREFERRED EMBODIMENTS

Thermoplastic polyester resins suitable for use in the invention contains dicarboxylic acid unit including at least 40 mol% of terephthalic acid and the remaining other dicarboxylic acids, for example, aliphatic dicarboxylic acids having 2-20 carbon atoms, such as azelaic acid, sebacic acid, adipic acid, dodecane dicarboxylic acid; or aromatic dicarboxylic acids, such as isophthalic acid, naphthalene dicarboxylic acid; alicyclic dicarboxylic acid such as cyclohexane dicarboxylic acid; alone or in combination.

The thermoplastic polyester resins contains also diol unit, which are, for example, aliphatic glycols such as ethylene glycol, 1,3-propane diol, 1,4-butane diol, 1,6-hexane diol, 1,10-decane diol, neopentyl glycol, 1,4-cyclohexane diol, 2-ethyl-2-butyl-1,3-propane diol, or alicyclic glycol, alone or in combination.

Of these saturated polyesters, especially are preferred polyethylene terephthalate or copolymerized polyesters consisting of dicarboxylic acid containing at least 40 mol% of terephthalic acid and diol containing at least 40 mol% of ethylene glycol, and polybutylene terephthalate or copolymerized polyesters consisting of at least 40 mol% dicarboxylic acid containing terephthalic acid and diol containing at least 40 mol% 1,4-butane diol.

The intrinsic viscosity [η] of saturated polyesters is desired within the range of 0.4-2.5. Here [η] is the value obtained from solution viscosity measured at 25° C. in a 50/50 (ratio by weight) mixed solvent of phenol and tetrachloroethane.

Mixing rate of (A) component is within the range of 30-98.985% by weight, preferably 45-90% by weight, based on the summed weight of components (A) to (D). Less than 30% by weight is associated with reduced flowability, while rates exceeding 98.985% by weight fails to achieve the object of the invention.

Carbon fiber, component (B), suitable for use in the invention may be made, for example, from polyacrylonitrile, pitch and lignin, and preferred to be more carbonized or graphitized.

The carbon fiber itself has a poor adhesiveness to polyethylene terephthalate or polybutylene terephthalate. Thus, it is preferred for improving the adhesiveness to make a treatment of the surface of carbon fiber, for example, with oxidation with nitric acid or ozone, or coating with such as epoxy or nylon resin.

The carbon fiber suitable for use in the invention is preferred to have a length of about 0.03-10 mm, notably preferably more than 0.4 mm to provide products of greater strength.

Mixing rate of (B) is preferred to be usually 1-60% by weight, preferably 10-50% by weight, based on the summed weight of components (A) to (D). More than 60% by weight involves reduced moldability from the view point of flowability, and below 1% by weight is unfavorable with too poor reinforcement effect of carbon fiber.

Component (c) is at least one compound selected from the following compounds (I), (II) and (III).

Compound (I) is at least one sulphur compound represented by the following formula (X):

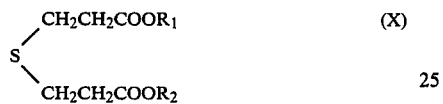

wherein $R_1$ and $R_2$ stand for $C_mH_{2m+1}$ radical, and m stands for a recurring number of 1 to 30. Specific examples of the above alkyl radical are methyl, ethyl, propyl, butyl, n-amyl, octyl, lauryl, myristyl, pentadecyl, cetyl, stearyl, ceryl and melissyl radicals. Among them, ethyl, lauryl and ceryl radicals are preferred. From the group consisting of the above-mentioned compounds, at least one member is selected for use.

Compound (II) is at least one salt of an organic carboxylic acid with a metal of the group Ia or IIa of the Periodic Table.

The organic carboxylic acids may be aliphatic or aromatic acids. The metallic salts of organic carboxylic acids are, for example, sodium laurylate, potassium laurylate, sodium myristate, potassium myristate, sodium stearate, potassium stearate, sodium octacosanate, potassium octacosanate, calcium myristate, calcium stearate, sodium benzoate, potassium benzoate, calcium benzoate, potassium terephthalate, sodium terephthalate, and litium terephthalate. Sodium stearate, sodium benzoate, potassium benzoate, and lithium terephthalate are especially preferred The specified metallic salts of organic carboxylic acids are usable alone or in combination.

Compound (III) is a phosphorous compound. Specific examples of the compound (III) are phosphoric acid, phosphoric esters such as trimethyl phosphate, methyldiethyl phosphate, triethyl phosphate, triisopropyl phosphate, tributyl phosphate, tri-2-ethylhexyl phosphate, tricresyl phosphate, triphenyl phosphate, tribenzyl phosphate, and tricyclohexyl phosphate; phosphorous acid; phosphorous esters such as trimethyl phosphite, trietyl phosphite, tributyl phosphite, tri(γ-hydroxybutyl)phosphite, and triphenyl phosphite; phosphonic acid; phosphonic acid derivatives such as phenyl phosphonic acid, phenyl phenylphosphonate, diphenyl phenylphosphonate, and phenyl phosphonate; phosphinic acid; phosphinic acid derivatives such as phenyl-phosphinic acid, methyl ester of dimethylphosphinic acid, phenyl ester of methylphosphinic acid; phosphine derivatives such as triphenylphosphine; and triphenylphosphine oxide; and one or more types may be selected from these groups. Among them, triphenyl phosphate, triethyl phosphate and tributyl phosphate are preferred.

The mixing rate of component (C) is within the range of 0.01 to 5% by weight, preferably 0.1 to 2% by weight based on the summed weight of components (A) to (D). Less than 0.01% by weight takes little improvement effects on sink mark and appearance of molded products, while more than 5% by weight reflects in fragile molded products. These rate changes therefore are disadvantageous.

Polycarbonate resins, component (D), suitable for use in the invention are represented by the following formula (IV), and one or more types selected from the groups listed above.

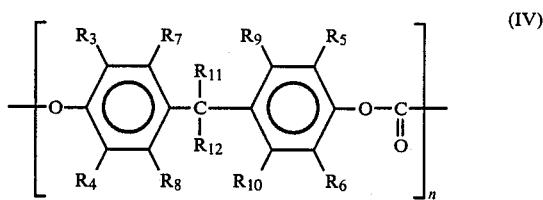

(Wherein $R_3$ through $R_{10}$ stand for independently a hydrogen atom or a halogen atom, $R_{11}$ and $R_{12}$ stand for independently an alkyl radical, and n stands for an average recurring number of not less than 3.)

In formula (IV), halogen atom is such of chlorine, bromine or iodine, and alkyl radicals are preferred to be those having 1-5 carbon atoms, though not definitely specified. More preferably, in formula (IV), $R_3$-$R_{10}$ all are hydrogen and $R_{11}$ and $R_{12}$ both are methyl radicals, or $R_3$-$R_6$ are chlorine or bromine, $R_7$-$R_{10}$ are hydrogen and $R_{11}$ and $R_{12}$ both are methyl radicals.

Besides, the average number of recurring units is 3 or more. Less than 3 on the average recurring units results in unsatisfactory improvement in prevention of occurrence of sink mark to the desired object of the invention.

The mixing rate of component (D) is preferred to be within the range 0.005-5% by weight, preferably 0.1-2% by weight, based on the summed weight of components (A) to (D). Rates less than 0.005% by weight take little effect of improving occurrence of sink mark and appearance, and rates more than 5% by weight reflect in too much foaming with consequent impaired appearance of products.

For preparing the carbon fiber reinforced polyester resin composition according to the invention is usable an arbitrary, not difinitely specified, conventional process applied to the preparation of resin compositions. For example, there are presented method of at the same time incorporating three components (A) through (C) and component (D) with kneading, and technique of making pellet-blending of a polyester consisting of (A), (B) and (C), and another polyester consisting of (A), (B) and (D).

Feeding of all components at the same time with kneading to an extruder is preferred to be performed at cylinder temperature lower than 280° C. to prevent foaming in the cylinder of the extruder.

Now an example of procedure of preparing the carbon fiber reinforced polyester resin composition according to the invention will be described below:

(a) desired amounts of components (B) of carbon fiber, and component (C) were added to component (A) of polyethylene terephthalate or polybutylene terephthalate, and mixed in a suitable mixer such as tumbler. The mixture was fed to an extruder or the like and extruded with melting and kneading to be pelletized.

(b) desired amounts of component (B) of carbon fiber, and component (D) of polycarbonate resin were added to component (A) of polyethylene terephthalate or polybutylene terephthalate, and proceeded in the same way as procedure (a) to be pelletized.

The pellets obtained in procedure (a) and (b) were pellet-blended at an arbitrary ratio directly before injection molding of them into formed products.

The carbon fiber reinforced polyester resin composition according to the invention may be modified within the scope of the object of the invention, for example, can be incorporated with various stabilizing agents such as ultraviolet absorber, antioxidant, and thermal deterioration proofing agent; pigment and dyestuff; flame retardant, matting agent, and others.

The invention will be described more fully by the following examples embodying the invention and comparative examples.

EXAMPLES OF THE INVENTION 1 THROUGH 54 AND COMPARATIVE EXAMPLES 1 THROUGH 6

To polyethylene terephthalate homopolymer of 0.72 in [η] or polybutylene terephthalate homopolymer of 1.00 in [η] were added arbitrary components (C) and (D) materials and 3 mm chopped strands of carbon fiber (CF) at mixing rates indicated in Tables 1-3, and then mixed in a V-type blender for 5 minutes. The mixture was extruded through a 65 mmφ bend melting extruder at cylinder temperature range of 250°-260° C. to be pelletized. Thus the carbon fiber reinforced polyester resins according to the invention was yielded. (Examples of the invention 1 through 54).

Each thus-obtained resin composition was molded through a 8-ounce screw-type injection molder under conditions: cylinder temperature, 270°-280° C.; mold temperature, 120° C.; molding cycle, 3 minutes; thus 33 mmφ×70 mm molded round bars being yielded.

The obtained molded products were evaluated of degree of sink mark occurrence by the following measuring foaming magnification and checked for occurrence of sink mark and appearance by naked eye. The obtained results are given in Tables 1-3. Mark o indicates no sink mark occurrence and good surface appearance of the molded products, and mark x indicates much sink mark occurrence and poor surface appearance of that, respectively.

Procedure of measuring forming rate

The above-mentioned 33 mmφ×70 mm round bars molded under a variety of conditions were evaluated of foaming magnification by calculation in accordance with the following equation:

$$\text{Foaming magnification} = \frac{\text{Specific gravity of blank}}{\text{Specific gravity of molded product}}$$

wherein specific gravity means that of molded product made from only components (A) and (B), hence excluding components (C) and (D).

Blank specific gravities of resin compositions having different carbon fiber contents are given in Table below.

| Rate of carbon fiber added to the carbon fiber reinforced polyester resin composition (% by weight) | Blank specific gravity | |
|---|---|---|
| | PBT | PET |
| 20 | 1.39 | 1.43 |
| 30 | 1.43 | 1.46 |
| 40 | 1.50 | 1.53 |

Comparative examples 1 through 6

As shown in Table 2, with exception of change of composition and mixing rates, the same procedure was performed to obtain compositions (Comparative Examples 1 through 6).

The yielded compositions were measured and observed in the same way as in Examples of the invention, and the obtained results are given in Table 4.

EFFECT OF THE INVENTION

As described above, the carbon fiber reinforced polyester resin composition according to the invention is adapted to be molded into products with minimized occurrence of sink mark and superior appearance, which are of remarkably great industrial worth.

TABLE 1

| | (A) Component | | (B) Component CF | | (C) Component | | (D) Component | | | |
|---|---|---|---|---|---|---|---|---|---|---|
| | Name | % by weight | (% by weight) | m | $R_1$ and $R_2$ radicals of Compound (I) | % by weight | $R_3$–$R_{10}$ | $R_{11}$–$R_{12}$ | n | % by weight |
| Exp. 1 | Polyethylene terephthalate | 79.89 | 20 | 12 | Lauryl radical | 0.1 | Hydrogen | Methyl radical | 95 | 0.01 |
| Exp. 2 | " | 79.80 | " | " | " | " | " | " | " | 0.1 |
| Exp. 3 | " | 78.90 | " | " | " | " | " | " | " | 1.0 |
| Exp. 4 | " | 74.90 | " | " | " | " | " | " | " | 5.0 |
| Exp. 5 | Polybutylene terephthalate | 79.89 | " | " | " | " | " | " | " | 0.01 |
| Exp. 6 | " | 79.80 | " | " | " | " | " | " | " | 0.1 |
| Exp. 7 | " | 77.90 | " | " | " | " | " | " | " | 2.0 |
| Exp. 8 | " | 74.90 | " | " | " | " | " | " | " | 5.0 |

TABLE 1-continued

| | | | | | | | | | | |
|---|---|---|---|---|---|---|---|---|---|---|
| Exp. 9 | Polyethylene terephthalate | 68.90 | 30 | " | " | " | " | " | " | 1.0 |
| Exp. 10 | " | 48.90 | 50 | " | " | " | " | " | " | " |
| Exp. 11 | " | 78.90 | 20 | 2 | Ethyl radical | " | " | " | " | " |
| Exp. 12 | " | " | " | 26 | Ceryl radical | " | " | " | " | " |
| Exp. 13 | " | 78.50 | " | 12 | Lauryl radical | 0.5 | " | " | " | " |
| Exp. 14 | " | 74.0 | " | " | " | 5.0 | " | " | " | " |
| Exp. 15 | " | 78.90 | " | " | " | 0.1 | " | " | " | " |
| Exp. 16 | " | " | " | " | " | " | " | Ethyl radical | 3 | " |
| Exp. 17 | " | " | " | " | " | " | (1) | Methyl radical | 89 | " |
| Exp. 18 | " | " | " | " | " | " | (2) | " | 95 | " |

| | Property | | | |
|---|---|---|---|---|
| | Specific gravity of molded product | Foaming magnification | Sink mark of molded product | Surface appearance |
| Exp. 1 | 1.39 | 1.03 | o | o |
| Exp. 2 | 1.19 | 1.20 | " | " |
| Exp. 3 | 1.01 | 1.41 | " | " |
| Exp. 4 | 0.90 | 1.60 | " | " |
| Exp. 5 | 1.35 | 1.03 | " | " |
| Exp. 6 | 1.17 | 1.19 | " | " |
| Exp. 7 | 0.91 | 1.52 | " | " |
| Exp. 8 | 0.89 | 1.56 | " | " |
| Exp. 9 | 1.04 | 1.40 | " | " |
| Exp. 10 | 1.12 | 1.37 | " | " |
| Exp. 11 | 1.02 | 1.40 | " | " |
| Exp. 12 | 1.03 | 1.39 | " | " |
| Exp. 13 | 0.93 | 1.54 | " | " |
| Exp. 14 | 0.89 | 1.60 | " | " |
| Exp. 15 | 1.01 | 1.42 | " | " |
| Exp. 16 | 1.01 | 1.41 | " | " |
| Exp. 17 | 1.01 | 1.42 | " | " |
| Exp. 18 | 1.00 | 1.43 | " | " |

(1) $R_3-R_6$ chlorine
$R_7-R_{10}$ hydrogen
(2) $R_3-R_6$ bromine
$R_7-R_{10}$ hydrogen

TABLE 2

| | Composition | | | | | | | | |
|---|---|---|---|---|---|---|---|---|---|
| | (A) Component | | (B) Component CF | (C) Component | | (D) Component | | | |
| | Name | % by weight | (% by weight) | Compound (II) | % by weight | $R_3-R_{10}$ | $R_{11}-R_{12}$ | n | % by weight |
| Exp. 19 | Polyethylene terephthalate | 79.89 | 20 | Sodium benzoate | 0.1 | Hydrogen | Methyl radical | 95 | 0.01 |
| Exp. 20 | " | 79.80 | " | " | " | " | " | " | 0.1 |
| Exp. 21 | " | 78.90 | " | " | " | " | " | " | 1.0 |
| Exp. 22 | " | 74.90 | " | " | " | " | " | " | 5.0 |
| Exp. 23 | Polybutylene terephthalate | 79.89 | " | " | " | " | " | " | 0.01 |
| Exp. 24 | " | 79.80 | " | " | " | " | " | " | 0.1 |
| Exp. 25 | " | 77.90 | " | " | " | " | " | " | 2.0 |
| Exp. 26 | " | 74.90 | " | " | " | " | " | " | 5.0 |
| Exp. 27 | Polyethylene terephthalate | 68.90 | 30 | " | " | " | " | " | 1.0 |
| Exp. 28 | " | 48.90 | 50 | " | " | " | " | " | " |
| Exp. 29 | " | 78.90 | 20 | Sodium stearate | " | " | " | " | " |
| Exp. 30 | " | " | " | Potassium benzoate | " | " | " | " | " |
| Exp. 31 | " | 78.50 | " | Sodium benzoate | 0.5 | " | " | " | " |
| Exp. 32 | " | 74.0 | " | " | 5.0 | " | " | " | " |
| Exp. 33 | " | 78.90 | " | " | 0.1 | " | " | 3 | " |
| Exp. 34 | " | " | " | " | " | " | Ethyl radical | 89 | " |
| Exp. 35 | " | " | " | " | " | (1) | Methyl radical | 95 | " |
| Exp. 36 | " | " | " | " | " | (2) | " | " | " |

| | Property | | | |
|---|---|---|---|---|
| | Specific gravity of molded product | Foaming magnification | Sink mark of molded product | Surface appearance |
| Exp. 19 | 1.38 | 1.04 | o | o |
| Exp. 20 | 1.18 | 1.21 | " | " |
| Exp. 21 | 1.01 | 1.41 | " | " |
| Exp. 22 | 0.90 | 1.59 | " | " |
| Exp. 23 | 1.35 | 1.03 | " | " |
| Exp. 24 | 1.18 | 1.18 | " | " |
| Exp. 25 | 0.91 | 1.52 | " | " |
| Exp. 26 | 0.89 | 1.56 | " | " |
| Exp. 27 | 1.04 | 1.40 | " | " |
| Exp. 28 | 1.11 | 1.38 | " | " |
| Exp. 29 | 1.02 | 1.40 | " | " |
| Exp. 30 | 1.03 | 1.39 | " | " |
| Exp. 31 | 0.93 | 1.54 | " | " |

TABLE 2-continued

|  | | |  |  |
|---|---|---|---|---|
| Exp. 32 | 0.89 | 1.60 | " | " |
| Exp. 33 | 1.01 | 1.42 | " | " |
| Exp. 34 | 1.00 | 1.43 | " | " |
| Exp. 35 | 1.01 | 1.42 | " | " |
| Exp. 36 | 1.01 | 1.42 | " | " |

(1) $R_3$–$R_6$ chlorine
 $R_7$–$R_{10}$ hydrogen
(2) $R_3$–$R_6$ bromine
 $R_7$–$R_{10}$ hydrogen

TABLE 3

| | (A) Component | | (B) Component CF | (C) Component | | (D) Component | | | |
|---|---|---|---|---|---|---|---|---|---|
| | Name | % by weight | (% by weight) | Compound (III) | % by weight | $R_3$–$R_{10}$ | $R_{11}$–$R_{12}$ | n | % by weight |
| Exp. 37 | Polyethylene terephthalate | 79.89 | 20 | Triphenyl phosphate | 0.1 | Hydrogen | Methyl radical | 95 | 0.01 |
| Exp. 38 | " | 79.80 | " | " | " | " | " | " | 0.1 |
| Exp. 39 | " | 78.90 | " | " | " | " | " | " | 1.0 |
| Exp. 40 | " | 74.90 | " | " | " | " | " | " | 5.0 |
| Exp. 41 | Polybutylene terephthalate | 79.89 | " | " | " | " | " | " | 0.01 |
| Exp. 42 | " | 79.80 | " | " | " | " | " | " | 0.1 |
| Exp. 43 | " | 77.90 | " | " | " | " | " | " | 2.0 |
| Exp. 44 | " | 74.90 | " | " | " | " | " | " | 5.0 |
| Exp. 45 | Polyethylene terephthalate | 68.90 | 30 | " | " | " | " | " | 1.0 |
| Exp. 46 | " | 48.90 | 50 | " | " | " | " | " | " |
| Exp. 47 | " | 78.90 | 20 | Triethyl phosphate | " | " | " | " | " |
| Exp. 48 | " | " | " | Tributyl phosphate | " | " | " | " | " |
| Exp. 49 | " | 78.50 | " | Triphenyl phosphate | 0.5 | " | " | " | " |
| Exp. 50 | " | 74.0 | " | " | 5.0 | " | " | " | " |
| Exp. 51 | " | 78.90 | " | " | 0.1 | " | " | 3 | " |
| Exp. 52 | " | " | " | " | " | " | Butyl radical | 89 | " |
| Exp. 53 | " | " | " | " | " | (1) | Methyl radical | 95 | " |
| Exp. 54 | " | " | " | " | " | (2) | " | " | " |

| | Property | | | |
|---|---|---|---|---|
| | Specific gravity of molded product | Foaming magnification | Sink mark of molded product | Surface appearance |
| Exp. 37 | 1.38 | 1.04 | o | o |
| Exp. 38 | 1.23 | 1.16 | " | " |
| Exp. 39 | 1.04 | 1.38 | " | " |
| Exp. 40 | 0.90 | 1.59 | " | " |
| Exp. 41 | 1.34 | 1.04 | " | " |
| Exp. 42 | 1.17 | 1.19 | " | " |
| Exp. 43 | 0.92 | 1.50 | " | " |
| Exp. 44 | 0.88 | 1.58 | " | " |
| Exp. 45 | 1.07 | 1.37 | " | " |
| Exp. 46 | 1.13 | 1.36 | " | " |
| Exp. 47 | 1.04 | 1.38 | " | " |
| Exp. 48 | 1.03 | 1.39 | " | " |
| Exp. 49 | 0.98 | 1.46 | " | " |
| Exp. 50 | 0.95 | 1.50 | " | " |
| Exp. 51 | 1.03 | 1.39 | " | " |
| Exp. 52 | 1.03 | 1.39 | " | " |
| Exp. 53 | 1.04 | 1.38 | " | " |
| Exp. 54 | 1.04 | 1.38 | " | " |

(1) $R_3$–$R_6$ chlorine
 $R_7$–$R_{10}$ hydrogen
(2) $R_3$–$R_6$ bromine
 $R_7$–$R_{10}$ hydrogen

TABLE 4

| | (A) Component | | (B) Component CF | (C) Component | | (D) Component | | | |
|---|---|---|---|---|---|---|---|---|---|
| | Name | % by weight | (% by weight) | Name | % by weight | $R_3$–$R_{10}$ | $R_{11}$–$R_{12}$ | n | % by weight |
| Comparative Exp. 1 | Polyethylene terephthalate | 79.90 | 20 | Sodium benzoate | 0.1 | — | — | — | — |
| Comparative Exp. 2 | " | 79.00 | " | — | — | Hydrogen | Methyl radical | 95 | 1.0 |
| Comparative Exp. 3 | " | 73.00 | " | Sodium benzoate | 6.0 | " | " | " | " |
| Comparative Exp. 4 | " | 73.90 | " | Sodium benzoate | 0.1 | " | " | " | 6.0 |

TABLE 4-continued

| | | | | | | | | | |
|---|---|---|---|---|---|---|---|---|---|
| Comparative Exp. 5 | " | 79.9 | " | Triphenyl phosphate | 0.1 | — | — | — | — |
| Comparative Exp. 6 | " | 73.0 | " | Triphenyl phosphate | 6.0 | Hydrogen | Methyl radical | 95 | 1.0 |

| | Property | | | |
|---|---|---|---|---|
| | Specific gravity of molded product | Foaming magnification | Sink mark of molded product | Surface appearance |
| Comparative Exp. 1 | 1.43 | 1.00 | x | o |
| Comparative Exp. 2 | 1.43 | " | " | " |
| Comparative Exp. 3 | 0.76 | 1.88 | o | x |
| Comparative Exp. 4 | 0.74 | 1.92 | " | " |
| Comparative Exp. 5 | 1.43 | 1.00 | x | o |
| Comparative Exp. 6 | 0.84 | 1.71 | o | x |

What is claimed is:

1. A carbon fiber reinforced polyester resin composition comprising:
   (A) 30 to 98.985% by weight of a thermoplastic polyester resin,
   (B) 1 to 60% by weight of a carbon fiber,
   (C) 0.01 to 5% by weight of at least one salt of an organic carboxylic acid with a metal of the group Ia or IIa of the Periodic Table, and
   (D) 0.005 to 5% by weight of at least one polycarbonate resin having the formula:

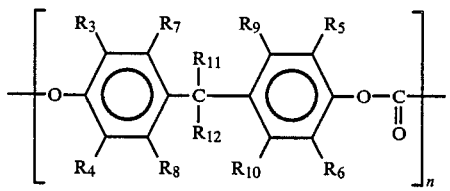

wherein $R_3$–$R_{10}$ are each independently a hydrogen atom or a halogen atom, $R_{11}$ and $R_{12}$ are each a lower alkyl radical and n is an average recurring number of not less than 3.

2. The carbon fiber reinforced polyester resin of claim 1, wherein said metal salt of the organic carboxylic acid is selected from the group consisting of sodium laurylate, potassium laurylate, sodium myristate, potassium myristate, sodium stearate, potassium stearate, sodium octacosonate, potassium octacosanate, calcium myristate, calcium stearate, sodium benzoate, potassium benzoate, calcium benzoate, potassium terephthalate, sodium terephthalate and lithium terephthalate.

3. The carbon fiber reinforced polyester resin composition of claim 1, wherein said metal salt of the organic carboxylic acid is selected from the group consisting of sodium benzoate, potassium benzoate and sodium stearate.

4. The carbon fiber reinforced polyester resin composition of claim 1, wherein said thermoplastic polyester resin is present in the amount of about 45–90% by weight.

5. The carbon fiber reinforced polyester resin composition of claim 1, wherein said thermoplastic polyester resin comprises:

(A) a dicarboxylic acid unit, comprising at least 40 mole % of terephthalic acid and one or more other dicarboxylic acids comprising (i) aliphatic acids selected from the group consisting of azelaic acid, sebacic acid, adipic acid and dodecane dicarboxylic acid; (ii) aromatic dicarboxylic acids selected from the group consisting of isophthalic acid and naphthalene dicarboxylic acid; and (iii) cyclohexane dicarboxylic acid; and (B) a diol unit, comprising an aliphatic glycol selected from the group consisting of ethylene glycol, 1,3-propane diol, 1,4-butane diol, 1,6-hexane diol, 1,10-decane diol, neopentyl glycol, 1,4-cyclohexane diol, and 2-ethyl-2-butyl-1,3-propane diol.

6. The carbon fiber reinforced polyester resin composition of claim 1, wherein said thermoplastic polyester resin has an intrinsic viscosity $[\eta]$ in the range of 0.4–2.5 as measured at 25° C. in a 50/50 weight ratio of resin to solvent, said solvent being a mixed solvent of phenol and tetrachloroethane.

7. The carbon fiber reinforced polyester resin composition of claim 1, wherein said carbon fiber has a surface which has been oxidized by nitric acid or ozone, or said surface is coated with epoxy or nylon resin.

8. The carbon fiber reinforced polyester resin composition of claim 1, wherein said carbon fiber has a length of about 0.03–10 mm.

9. The carbon fiber reinforced polyester resin composition of claim 1, wherein said carbon fiber is present in the amount of 10–50% by weight, based on the total weight of components (A)–(D).

10. The carbon fiber reinforced polyester resin composition of claim 1, wherein said compound (C) is present in the amount of 0.1–2% by weight, based on the total weight of components (A)–(D).

11. The carbon fiber reinforced polyester resin composition of claim 1, wherein said polycarbonate resin is present in the amount of 0.1–2% by weight, based on the total weight of components (A)–(D).

12. The carbon fiber reinforced polyester resin composition of claim 10 wherein said polycarbonate resin is one in which all of $R_3$–$R_{10}$ are hydrogen, and both $R_{11}$ and $R_{12}$ are methyl radicals.

13. The carbon fiber reinforced polyester resin composition of claim 10 wherein said polycarbonate resin is one in which all of $R_3$-$R_6$ are chlorine, $R_7$-$R_{10}$ are hydrogen, and both $R_{11}$ and $R_{12}$ are methyl redicals.

14. The carbon fiber reinforced polyester resin composition of claim 10 wherein said polycarbonate resin is one in which all of $R_3$-$R_6$ are bromine, $R_7$-$R_{10}$ are hydrogen, and both $R_{11}$ and $R_{12}$ are methyl radicals.

15. The carbon fiber reinforced polyester resin composition of claim 10 wherein said (A) a thermoplastic polyester resin is polyethylene terephthalate.

16. The carbon fiber reinforced polyester resin composition of claim 10 wherein said (A) a thermoplastic polyester resin is polybutylene terephthalate.

* * * * *